United States Patent
Yoo et al.

(10) Patent No.: US 7,607,791 B2
(45) Date of Patent: Oct. 27, 2009

(54) LIQUID CRYSTAL DISPLAY DEVICE INCLUDING A COLD CATHODE FLUORESCENT LAMP AND A CONTAINER FOR RECEIVING THE SAME

(75) Inventors: Hyeong-Suk Yoo, Seongnam-si (KR); Keun-Woo Lee, Gyeonggi-do (KR); Jong-Dae Park, Seoul (KR); Jae-Ho Jung, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 445 days.

(21) Appl. No.: 11/136,634

(22) Filed: May 24, 2005

(65) Prior Publication Data

US 2005/0231979 A1    Oct. 20, 2005

Related U.S. Application Data

(62) Division of application No. 10/277,703, filed on Oct. 22, 2002, now Pat. No. 6,905,224.

(30) Foreign Application Priority Data

Dec. 19, 2001    (KR) ............................... 2001-81364

(51) Int. Cl.
*G09F 13/04* (2006.01)
*G02F 1/13357* (2006.01)
*H01R 33/02* (2006.01)

(52) U.S. Cl. ...................... 362/97.2; 362/225; 362/223; 349/70; 439/239

(58) Field of Classification Search .................. 362/97, 362/223, 225; 349/64, 70; 439/877–882, 439/239–241
See application file for complete search history.

(56) References Cited

U.S. PATENT DOCUMENTS 533,910 A * 2/1895 Metzger ..................... 439/877

(Continued)

FOREIGN PATENT DOCUMENTS

CN    244027    3/1995

(Continued)

OTHER PUBLICATIONS

Republic of China Patent Publication No. 244027; Published: Mar. 21, 1995; (See Above for English-Langauge Equivalent Application of Republic of China Patent Publication No. 244027).

(Continued)

*Primary Examiner*—Ismael Negron
(74) *Attorney, Agent, or Firm*—Cantor Colburn LLP

(57) ABSTRACT

A backlight assembly including a lamp having a lamp tube and first and second conductive members, a container body exposing the lamp tube while covering the first and second conductive members, a power-supplying means receiving the first and second conductive members and providing them with power, and a light uniformity improving means. A liquid crystal display panel assembly is coupled to the backlight assembly so as to display a picture by controlling a transmittance of the light passing through the light uniformity improving means.

15 Claims, 14 Drawing Sheets

U.S. PATENT DOCUMENTS

| | | | | |
|---|---|---|---|---|
| 768,479 | A * | 8/1904 | O'Brien | 439/239 |
| 1,137,773 | A * | 5/1915 | Marsden | 439/239 |
| 1,227,726 | A * | 5/1917 | Woodhead | 439/868 |
| 1,293,594 | A * | 2/1919 | Willey | 439/239 |
| 1,552,121 | A * | 9/1925 | Dau | 439/239 |
| 1,717,762 | A | 6/1929 | Davis | |
| 1,851,673 | A | 3/1932 | Kilgour | |
| 2,286,696 | A | 6/1942 | Tinnerman | |
| 2,338,835 | A * | 1/1944 | Bryant | 439/241 |
| 2,505,775 | A | 5/1950 | Hubbell | |
| 2,535,013 | A * | 12/1950 | Freedom | 439/877 |
| 2,560,212 | A | 7/1951 | Byrd et al. | |
| 3,176,260 | A | 3/1965 | Pascucci | |
| 3,320,466 | A * | 5/1967 | Ayres et al. | 439/612 |
| 3,333,228 | A * | 7/1967 | Ege | 439/239 |
| 3,861,780 | A * | 1/1975 | Hobbs, II | 439/877 |
| 4,023,884 | A * | 5/1977 | Morlan | 439/628 |
| 4,282,566 | A * | 8/1981 | Newman | 362/369 |
| 4,312,028 | A | 1/1982 | Hamacher | |
| 4,918,582 | A * | 4/1990 | McIngvale et al. | 362/217 |
| 4,951,389 | A * | 8/1990 | Kaley et al. | 439/882 |
| 4,979,081 | A * | 12/1990 | Leach et al. | 362/219 |
| 5,315,211 | A | 5/1994 | Ditlevsen et al. | |
| 5,354,208 | A * | 10/1994 | Salaski et al. | 439/239 |
| 5,418,331 | A * | 5/1995 | Delalle | 439/882 |
| 5,610,472 | A | 3/1997 | Schmitt, Jr. | |
| 5,676,459 | A * | 10/1997 | Bedford et al. | 362/390 |
| 5,726,722 | A * | 3/1998 | Uehara et al. | 349/66 |
| 5,879,203 | A * | 3/1999 | Egle et al. | 439/830 |
| 6,135,620 | A * | 10/2000 | Marsh | 362/377 |

FOREIGN PATENT DOCUMENTS

| | | |
|---|---|---|
| EP | 0 466 138 | 11/1995 |
| JP | 3-89447 | 4/1991 |
| JP | 08-273625 | 10/1996 |
| JP | 8-273625 | 10/1996 |
| JP | 2001-015082 | 1/2001 |
| KR | 1020000018707 | 4/2000 |
| KR | 1020010048774 | 6/2001 |
| KR | 1020010074027 | 8/2001 |

OTHER PUBLICATIONS

Chinese Patent Application Office Action for Application No. 02821145.6-English TRanslation; Dated: Jun. 29, 2006.

Korean Office Action dated Feb. 23, 2007 for Korean Application No. 10-2001-0081364 (All References cited in Office Action cited above).

* cited by examiner

LIQUID CRYSTAL DISPLAY DEVICE INCLUDING A COLD CATHODE FLUORESCENT LAMP AND A CONTAINER FOR RECEIVING THE SAME

CROSS REFERENCE TO RELATED APPLICATIONS

This application is a divisional application of U.S. patent application Ser. No. 10/277,703, filed on Oct. 22, 2002 now U.S. Pat. No. 6,905,224, the disclosure of which is herein incorporated by reference in its entirety.

BACKGROUND OF THE INVENTION

1. Field of the Invention

The present invention relates to a liquid crystal display device, and more particularly to a cold cathode fluorescent lamp capable of preventing a brightness variation generated when plural cathode fluorescent lamps are simultaneously driven by one driving apparatus, and capable of improving an assembling work and a shock resistance, a container for receiving the same and a liquid crystal display device having the container.

2. Description of the Related Art

As semiconductor technologies and electronic technologies are rapidly developed, data processing technologies are correspondingly rapidly developed to allow processing of a great amount of data in a short time.

Such data processing units output resulted data by processing great amount of data, but do not directly display the resulted data to a user. For this reason, data processed in the data processing unit are displayed through a display device, which acts as an interface between the data processing unit and the user. In this case, data are displayed in the form of letters, images and moving pictures.

The display device performing the above function includes an analog display device and a digital display device. A cathode ray tube (CRT) display device is such an analog display device, while a liquid crystal display (LCD) device is such a digital display device.

The CRT type display device performs the display function by precisely controlling the moving direction of electrons, which are discharged from an electronic gun at a high speed, in a Braun tube. Though the CRT type display device can display an image of high quality, the volume and weight thereof are greatly increased as an effective display area is enlarged. Accordingly, the CRT type display device is often called an "analog type display device".

To the contrary, the LCD contains a liquid crystal layer having a thickness of a micrometer (μm) unit between two transparent substrates. An electric field is applied, per a minute area unit, to the liquid crystal layer from an inner portion of one of transparent substrates, so that a transmittance degree of light is precisely controlled at each part of the liquid crystal layer.

To realize this, a thin film transistor of a matrix type forms is formed at an inner surface of one of the two opposite substrates. A transparent pixel electrode is formed at an output electrode of the thin film transistor. The pixel electrode is one of two electrodes for applying the electric field to the liquid crystal.

The second electrode for applying the electric field to the liquid crystal is a transparent common electrode formed at an inner surface of the other of the two opposite substrates. A constant reference voltage is supplied to the common electrode.

Hereinafter, a method for controlling the light transmittance degree of the liquid crystal will be described.

Firstly, each thin film transistor is respectively controlled so as to supply a required power into each pixel electrode. At this time, the constant reference voltage is supplied to the common electrode. Accordingly, different electric fields are formed between the pixel electrode and the common electrode, and the alignment of the liquid crystal is precisely varied according to the electric fields. The quantity of light passing through the liquid crystal is also varied according to the variation of the alignment of the liquid crystal. That is, the quantity of the light passing through the liquid crystal is controlled. Then, the light passes through a color pixel (or color filter) formed at a rear side of the common electrode. Accordingly, a full-color display is achieved.

The above-mentioned CRT type display device can display information in any place even where the light does not exist. However, the liquid crystal display device cannot display information in the place where the light is insufficient or does not exist.

This means that the liquid crystal display device is dependent upon the light. For this reason, the light is necessarily required in order to display information in the liquid crystal display device. The light may be an external light, such as sunlight and an illumination light, or the light may be an artificial light created by consuming an electric energy charged in the liquid crystal display device.

When the external light is used, power consumption will be reduced, but information cannot be displayed in the place where the external light does not exist. For this reason, recently, the display of information is carried out using an artificial light, which is created by consuming an electric energy charged in the liquid crystal display device.

A cold cathode fluorescent lamp is mainly used for creating the artificial light, although various kinds of lamps can be used as a device for creating the artificial light. The cold cathode fluorescent lamp has a low heating value, accordingly it prevents the liquid crystal from being liquefied. Also, the cold cathode fluorescent lamp has low power consumption and a long life span.

However, as the effective display area of the liquid crystal display device is enlarged, it is difficult to achieve the required brightness by using only one cold cathode fluorescent lamp. Accordingly, at least two cold cathode fluorescent lamps are adopted in, for example, a middle or large sized notebook computer, monitor and HDTV.

However, if a plurality of cold cathode fluorescent lamps is used, there are various problems not expected when using only one cold cathode fluorescent lamp.

Particularly, the problems frequently arise when a plurality of cold cathode fluorescent lamps are connected in parallel to one power supply device.

When a plurality of cold cathode fluorescent lamps is connected in parallel to one power supply device, a cold cathode fluorescent lamp having a relatively better current-flow characteristic is gradually brightened, and a cold cathode fluorescent lamp having a relatively worse current-flow characteristic is gradually darkened.

Accordingly, it is required to develop a technique for solving the nonuniform brightness problem generated when plural cold cathode fluorescent lamps are connected in parallel to one power supply device.

SUMMARY OF THE INVENTION

The present invention provides a cold cathode fluorescent lamp capable of preventing a brightness variation even when plural lamps are connected to one power supply device in parallel and lowering a power consumption.

The present invention provides a container, which facilitates an assembling work of the cold cathode fluorescent lamp, protects the cold cathode fluorescent lamp from being damaged by an external impact, and allows plural cold cathode fluorescent lamps to be simultaneously driven.

The present invention also provides a liquid crystal display device capable of reducing a brightness variation in an effective display area, lowering a power consumption required for displaying information, and saving an assembling time, thereby remarkably improving the quality of display.

In one aspect, there is provided a lamp comprising a lamp tube including a gas and a fluorescent material for generating a light, a first electrode extending from an exterior of the lamp tube into an interior of the lamp tube, an electrode socket connected to the first electrode and surrounding a portion of an outer surface of the lamp tube, and a second electrode formed at the outer surface of the lamp tube apart from the first electrode.

In another aspect, there is provided a container for receiving a plurality of lamps each including lamp tube and first and second conductive members, the container comprising a container body having a frame shape for exposing each lamp tube of the plurality of lamps and for covering the first and second conductive members of the plurality of lamps, and a clip type power-supplying means for fixing the first and second conductive members to the container body in a clip-coupling manner, and for supplying a power to the first and second conductive members.

In still another aspect, there is provided a liquid crystal display device comprising a backlight assembly including a lamp for generating a light and having a lamp and first and second conductive members, a container body for exposing the lamp tube of the lamp while covering the first and second conductive members, a power-supplying means supplying a power to the first and second conductive members and fixing the first and second conductive members to the container body, and light uniformity improving means for improving a uniformity of the light, and a liquid crystal display panel assembly coupled with the backlight assembly so as to display a picture by controlling a transmittance of the light passing through the light uniformity improving means.

BRIEF DESCRIPTION OF THE DRAWINGS

The above and other advantages of the present invention will become more apparent by describing in detail exemplary embodiments thereof with reference to the attached drawings in which.

DETAILED DESCRIPTION OF THE INVENTION

Figure 1:
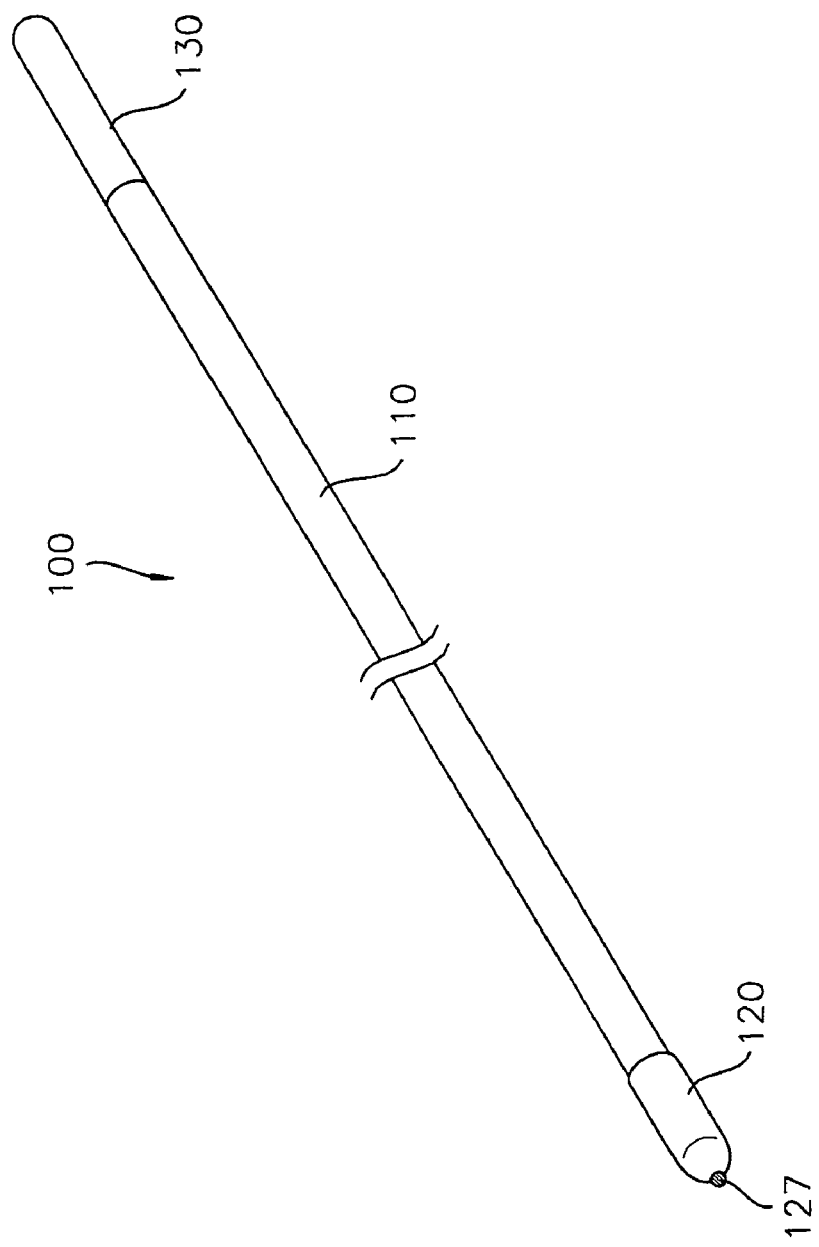
FIG. 1 is a partially cut perspective view of a cold cathode fluorescent lamp according to one embodiment of the present invention.

Hereinafter, the structure and effect of a cold cathode fluorescent lamp, a container for receiving the same and a liquid crystal display device having the container according to one embodiment of the present invention will be described with reference to accompanying drawings. Referring to FIG. 1, the cold cathode fluorescent lamp is shown with a reference numeral 100. The cold cathode fluorescent lamp 100 forms a part of a liquid crystal display device 900 (shown in FIG. 13) and generates a light required for displaying information.

Figure 2:
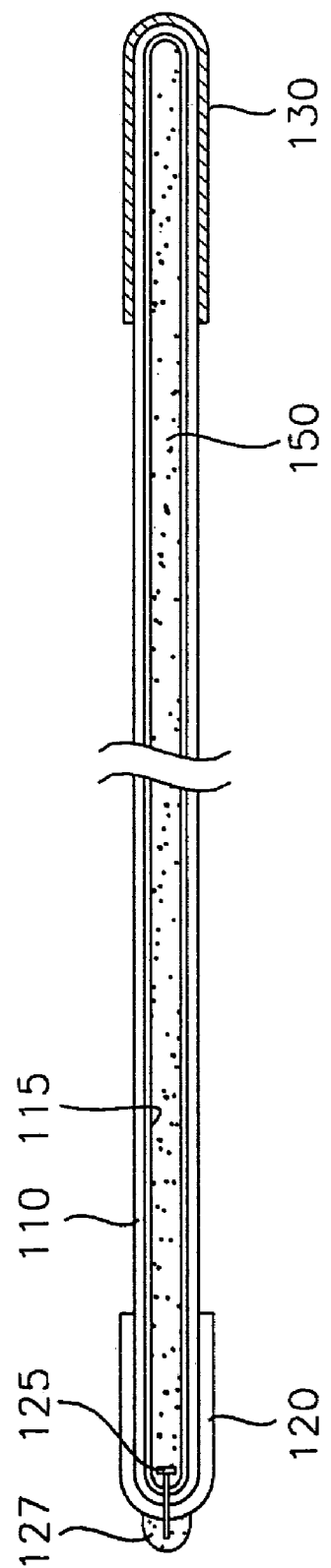
FIG. 2 is a sectional view showing a cold cathode fluorescent lamp according to one embodiment of the present invention.

Referring to FIGS. 1 and 2, the cold cathode fluorescent lamp 100 includes a lamp tube 110, a first electrode 125 (shown in FIG. 2), an electrode socket 120, and a second electrode 130.

For example, the lamp tube 110 is a transparent tube having predetermined thickness and length. A fluorescent material 115 is deposited at an inner wall of the lamp tube 110. The fluorescent material 115 converts a non-visible ray into a visible ray so as to allow a user to recognize the light. In addition, a gas 150 is filled in the lamp tube 110. The gas 150 generates non-visible ray to stimulate the fluorescent material to generate the visible ray.

As shown in FIG. 2, the lamp tube 110 is coupled with the first electrode 125, the electrode socket 120 and the second electrode 130. The arrangement of the first and second electrodes 125 and 130 is very important.

The first electrode 125 is installed at a predetermined portion of the lamp tube 110, for example, at one end portion of the lamp tube 110. One part of the first electrode 125 is positioned at an exterior of the lamp tube 110 and the other part of the first electrode 125 is positioned at an interior of the lamp tube 110.

The part of the first electrode 125 protruded out of the lamp tube 110 has a tiny size, so that it is difficult to supply a power thereto and to assemble the part to other device. For this reason, the electrode socket 120 is coupled with the first electrode 125 in order to assemble the part to other device. The electrode socket 120 enlarges an area coupled with an external power-supplying member.

More specifically, the electrode socket 120 has a cap shape coupled to an end portion of the lamp tube 110. The end portion of the lamp tube 110 and a portion of a circumferential portion of the lamp tube 110 extended from the end portion are covered with the electrode socket 120.

A perforation hole is formed in the electrode socket 120. The first electrode 125 is electrically connected to the electrode socket 120 through the perforation hole. Then, the electrode socket 120 and the first electrode 125 are welded to each other by using a solder 127.

In addition, as shown in FIGS. 1 and 2, the second electrode 130 is arranged on the lamp tube 110 spaced apart from the first electrode 125. The second electrode 130 is disposed on a surface of the lamp tube 110 by using an electroless plating technique such that it has a surface area larger than that of the electrode socket 120.

According to the electroless plating technique, metal ions included in an aqueous solution are reduced into metal molecules by electrons supplied from a reducing agent, thereby forming a minute metal layer on the surface of the metal tube 110. The electroless plating technique has an advantage that it can be applied to not only a metallic material, but also a non-metallic material.

The cold cathode fluorescent lamp 100 having the above structure according to one embodiment of the present invention can reduce a power consumption and improve a brightness uniformity.

Figure 3:
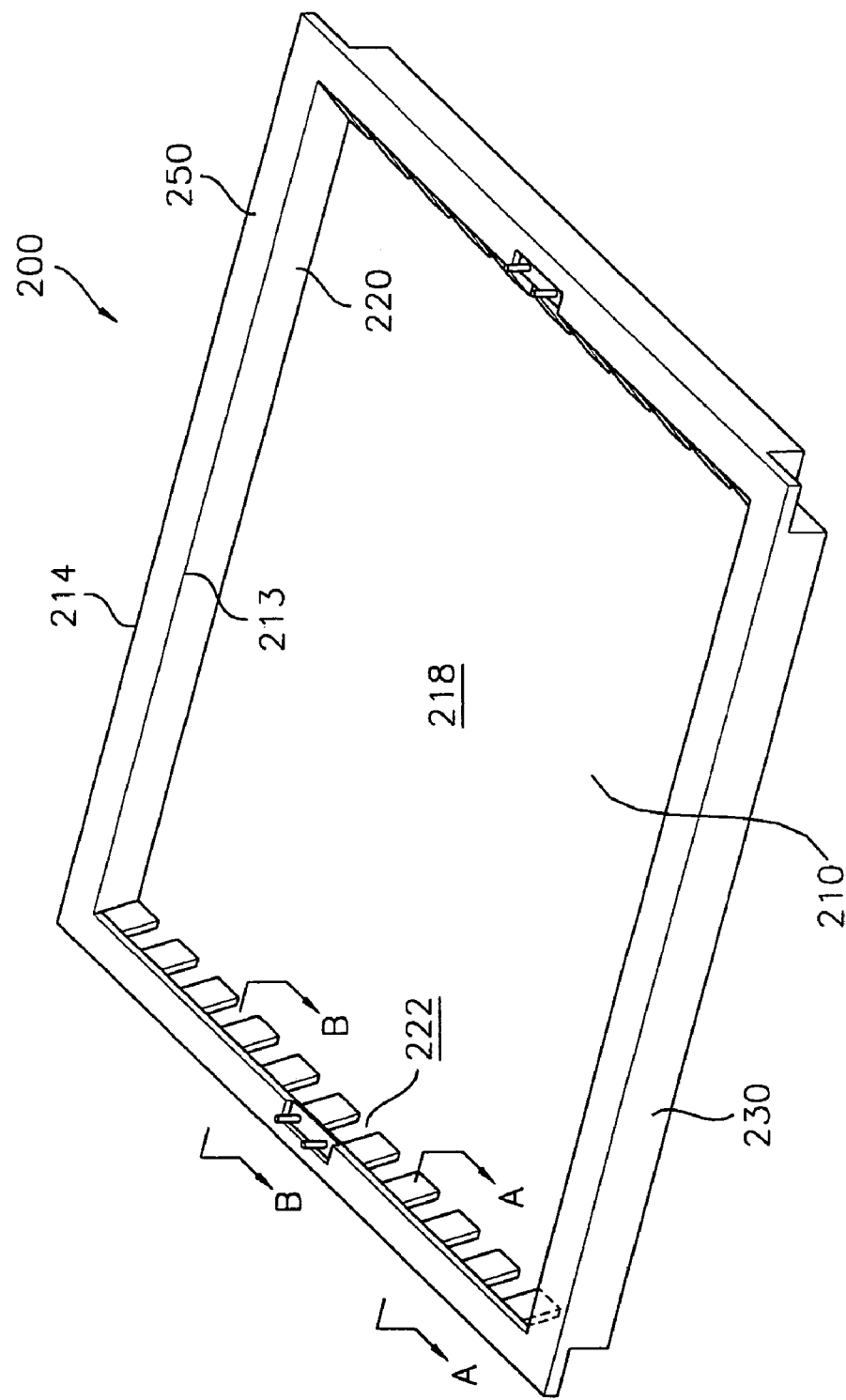
FIG. 3 is a sectional view showing a container of a cold cathode fluorescent lamp according to one embodiment of the present invention.

The cold cathode fluorescent lamp 100 is accommodated in a container 200 shown in FIG. 3.

The container 200 has a structure adapted for simultaneously receiving plural cold cathode fluorescent lamps 100 and adapted for supplying a driving power from an exterior into the cold cathode fluorescent lamps 100. The container 200 includes a container body and a clip type power-supplying module.

FIG. 3 is a perspective view of the container body 250 of the container 200. The container body 250 is a body for fixing the cold cathode fluorescent lamp 100 thereto. Specifically, the container body 250 covers the electrode sockets 120 and the second electrode 130 of the cold cathode fluorescent lamp 100, and exposes the lamp tube 110 to the exterior.

Hereinafter, the structure of the container body 250 of the container 200 will be described with reference to FIGS. 3 to 5.

Figure 4:
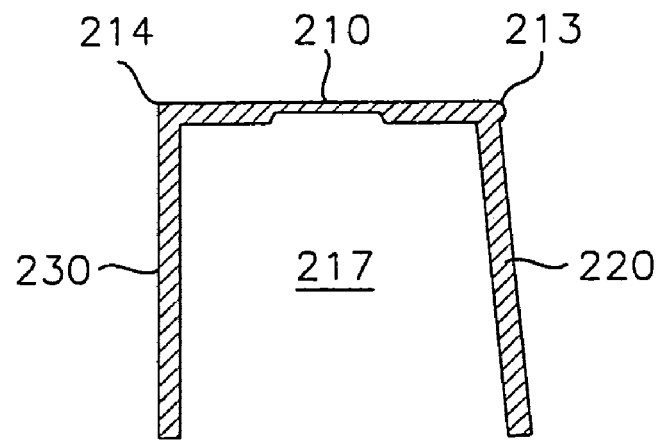
FIG. 4 is a sectional view taken along the line A-A in FIG. 3.
Figure 5:
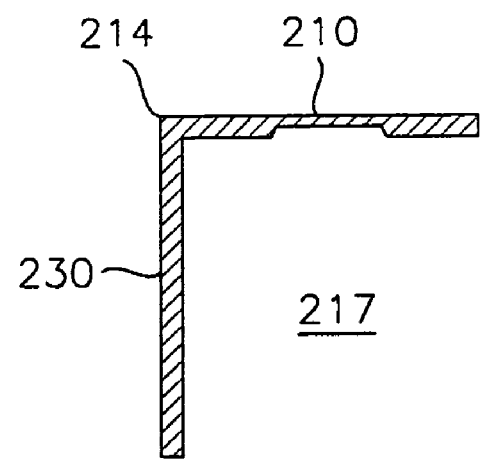
FIG. 5 is a sectional view taken along the line B-B in FIG. 3.

Referring to FIGS. 3 to 4, the container body 250 includes a first side 210, which is a base side, a second side 220, and a third side 230. The third side 230 is formed optionally.

The first side 210 has a frame shape including a rectangular inner edge 213 and a rectangular outer edge 214. The second side 220 is extended along the inner edge 213 of the first side to have a predetermined height. In addition, the third side 230 is extended along the outer edge 214 of the first side 210. The second and third sides 220 and 230 are perpendicular to the first side 210.

The electrode socket 120 and the second electrode 130 of the cold cathode fluorescent lamp 100 are positioned in a space 217 defined by the first and second sides 210 and 220. The lamp tube 110 of the cold cathode fluorescent lamp 100 is positioned at a space 218 surrounded by the second side 220.

In order to place the electrode socket 120 and the second electrode 130 in the space 217 defined by the first and second sides 210 and 220, a portion of the second side 220 is removed to form an opening 222. As shown in FIG. 3, openings 222 are formed on opposing surfaces of the second side 220. The number of the openings 222 is identical to the number of the cold cathode fluorescent lamps 100 shown in FIGS. 1 and 2.

Figure 6:
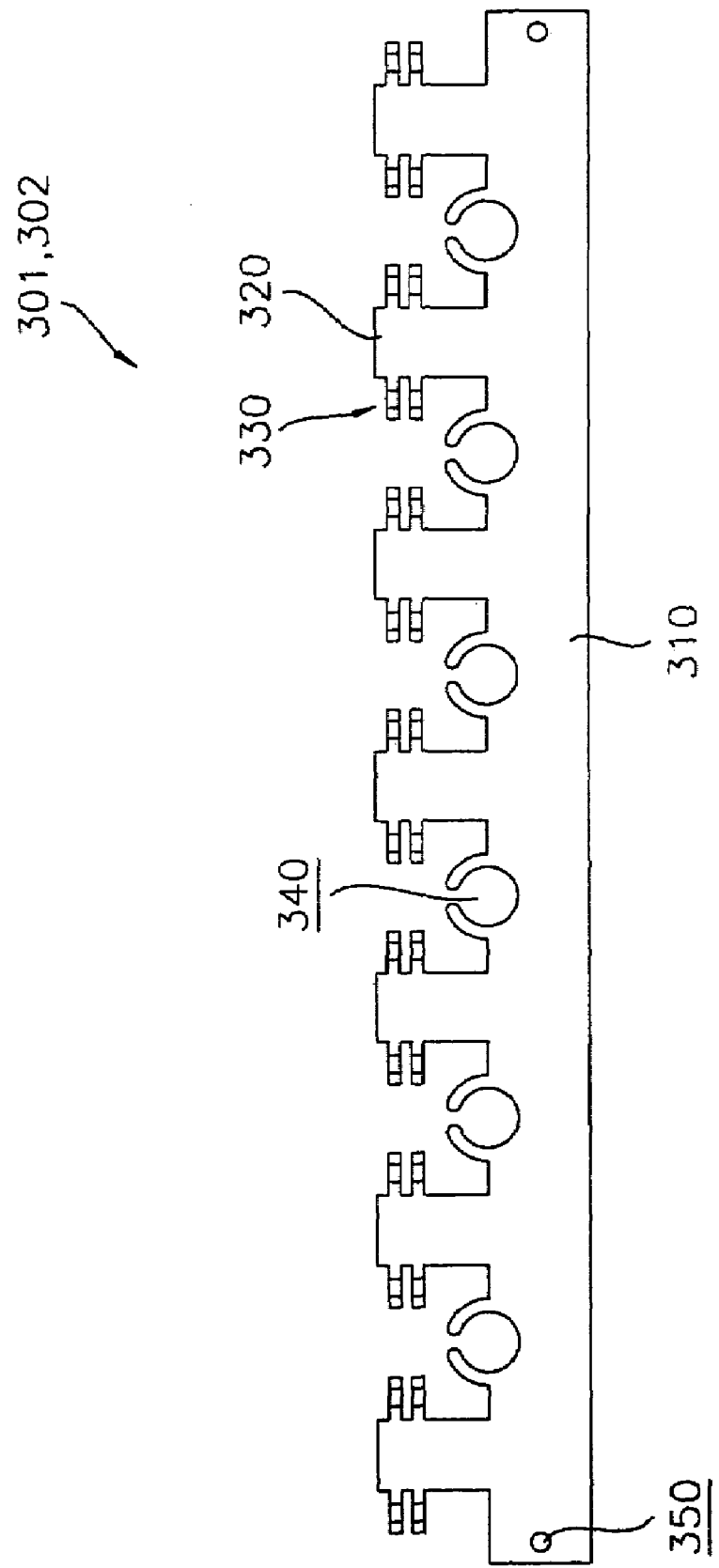
FIG. 6 is a developed view of a clip type power-supplying module according to one embodiment of the present invention.
Figure 7:
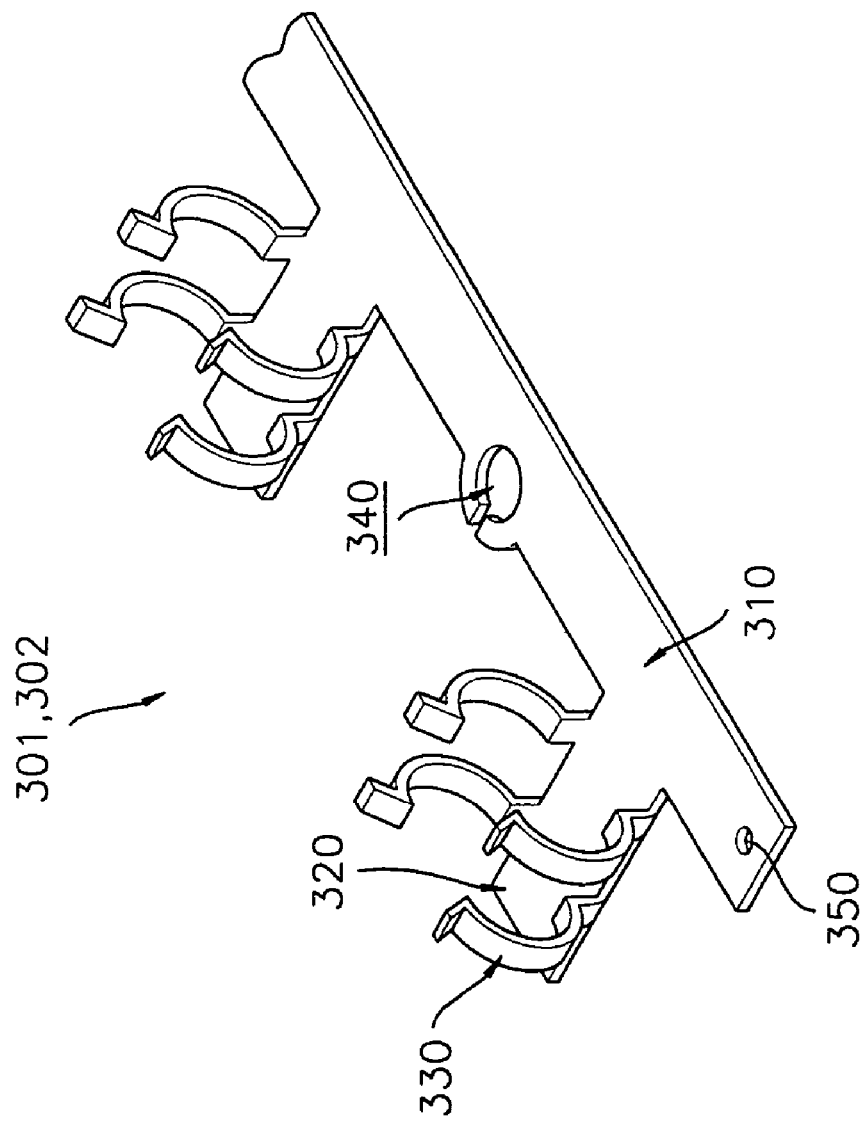
FIG. 7 is a perspective view of a clip type power-supplying module according to one embodiment of the present invention, which is assembled based on the developed view of the clip type power-supplying module shown in FIG. 6.
Figure 8:
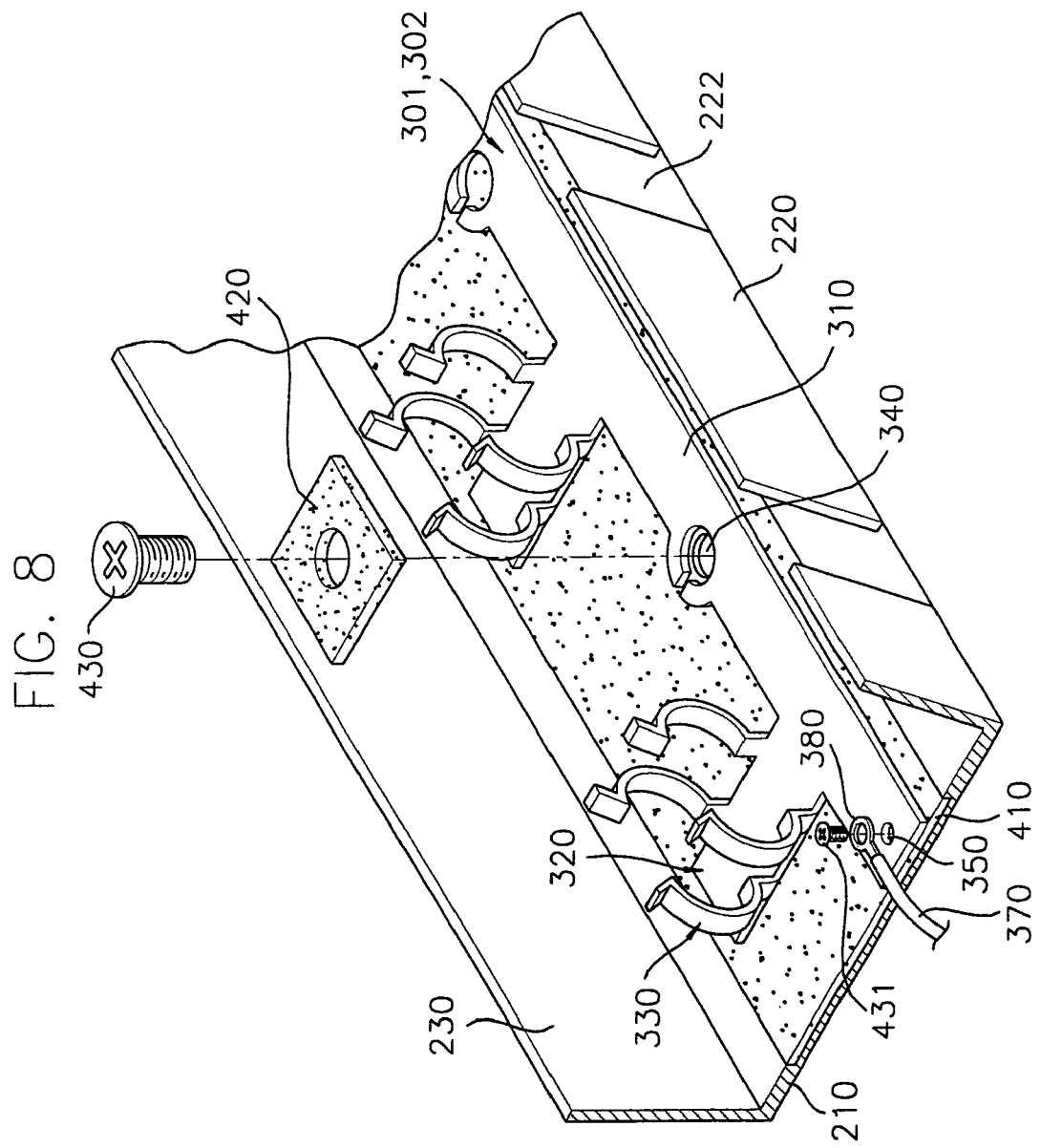
FIG. 8 is a partially cut perspective view of the clip type power-supplying module assembled with a container.

On the other hand, the clip type power-supplying modules are installed on the first side 210 inside the space 217. The clip type power-supplying modules are shown in FIGS. 6 to 8 with reference numerals 301 and 302.

The clip type power-supplying modules 301 and 302 allow the cold cathode fluorescent lamp 100 to be easily coupled or separated from the container 200.

The clip type power-supplying modules 301 and 302 apply an electric power to the electrode socket 120 and the second electrode 130 of the cold cathode fluorescent lamp 100.

The clip type power-supplying modules 301 and 302 include a conductive base body 310, a clip body section 320 and a clip section 330.

For example, the conductive base body 310 has a plate shape having a thin thickness, a narrow width and a long length. As shown in FIG. 8, the conductive base body 310 is installed at the first side 210 of the container body 250 in a direction perpendicular to the extending direction of the cold cathode fluorescent lamp 100.

The clip body sections 320 are protruded from the conductive base body 310 and spaced from each other by a predetermined interval, which is identical to a distance between the cold cathode fluorescent lamps 100. The clip body sections 320 are protruded in a direction identical to the disposed direction of the cold cathode fluorescent lamp 100, and overlapped with the electrode socket 120 and the second electrode 130 of the cold cathode fluorescent lamp 100.

Then, at least one clip section 330 is protruded from the clip body section 320 so as to grip the electrode socket 120 and the second electrode 130 of the cold cathode fluorescent lamp 100. According to one embodiment of the present invention, two separated clip sections 330 are extended from both sides of each clip body section 320, and are bendable so as to grip the electrode socket 120 and the second electrode 130 of the cold cathode fluorescent lamp 100.

The conductive base body 310, the clip body sections 320 and the clip sections 330 are made of conductive material for fixing the electrode socket 120 and the second electrode 130 of the cold cathode fluorescent lamp 100, and allowing the power to be supplied into the cold cathode fluorescent lamp 100 from the exterior.

The conductive base body 310 is coupled to the first side 210 of the container body 250, for example, through a screw 430. The conductive base body 310 has a coupling section 340 between the clip body sections 320, to which the screw 430 is coupled. The conductive base body 310 may not have the coupling section 340 between every two adjacent clip body sections 320.

As shown in FIG. 8, a power supply line 370 is connected to the conductive base body 310 coupled with the electrode socket 120 and the second electrode 130 of the cold cathode fluorescent lamp 100. A conductive coupling terminal 380 having an annular shape is installed at an end of the power supply line 370, and a coupling hole 350 is formed in the conductive base body 310. The coupling terminal 380 of the power supply line 370 is securely coupled to the coupling hole 350 of the conductive base body 310, for example, by means of a screw 431.

Figure 9:
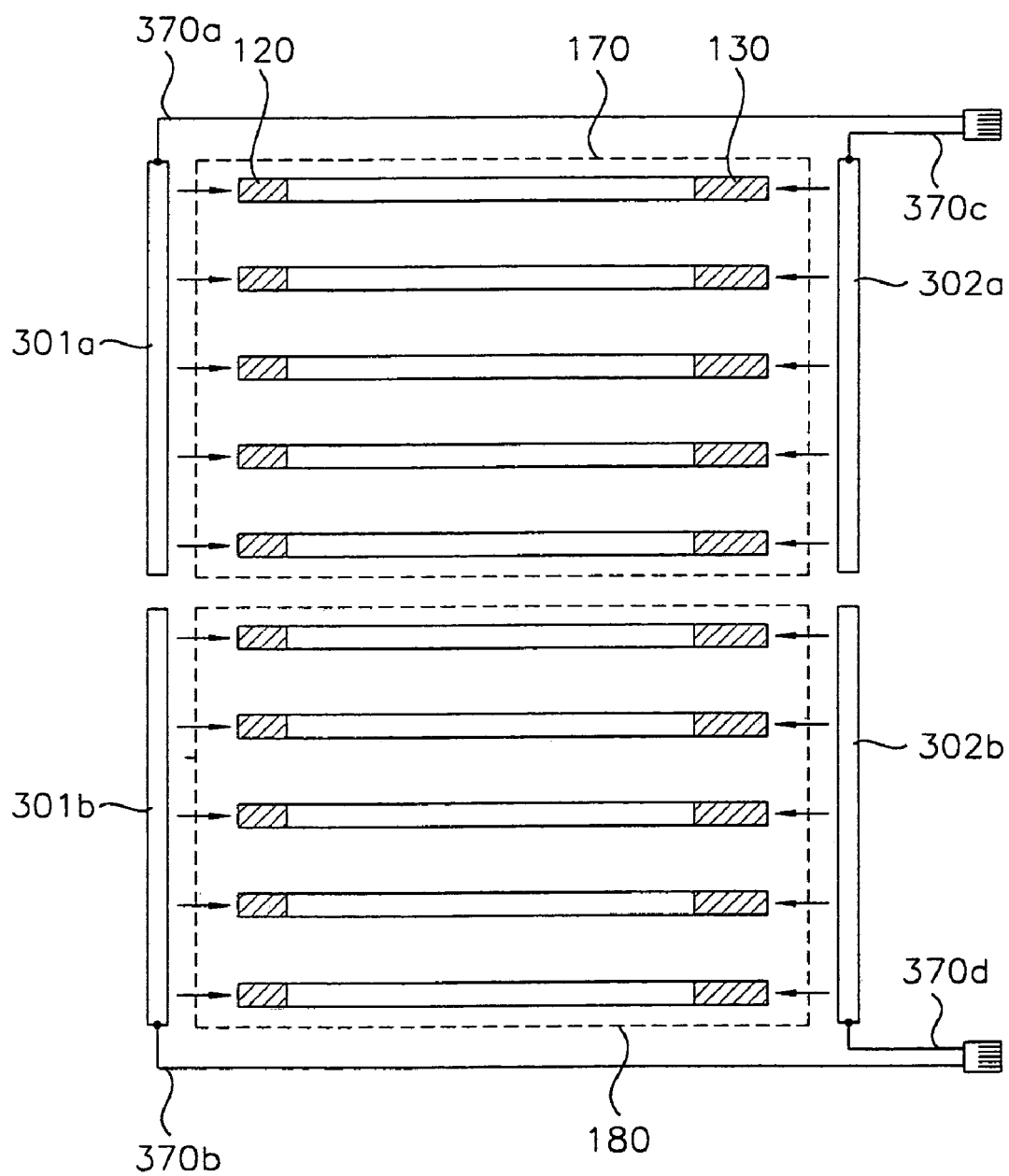
FIG. 9 is a schematic view showing a plurality of cold cathode fluorescent lamps according to another embodiment of the present invention.

Referring to FIG. 9, a plurality of cold cathode fluorescent lamps 100 are divided into at least two groups. Two groups of the cold cathode fluorescent lamps 100 are represented by the reference numerals 170 and 180, respectively.

First clip type power-supplying modules 301*a* and 301*b* bare coupled to electrode sockets 120 of the lamp groups 170 and 180, and second clip type power-supplying modules 302*a* and 302*b* are connected to second electrodes 130 of the lamp groups 170 and 180. The number of each of the first and second clip type power-supplying modules is the same as the number of lamp groups.

Signal lines 370a, 370b, 370c and 370d are connected to first and second clip type power-supplying modules 301a, 301b, 302a and 302b and are disposed along an inner edge of the container body 250 and withdrawn out of the container body 250.

Figure 10:
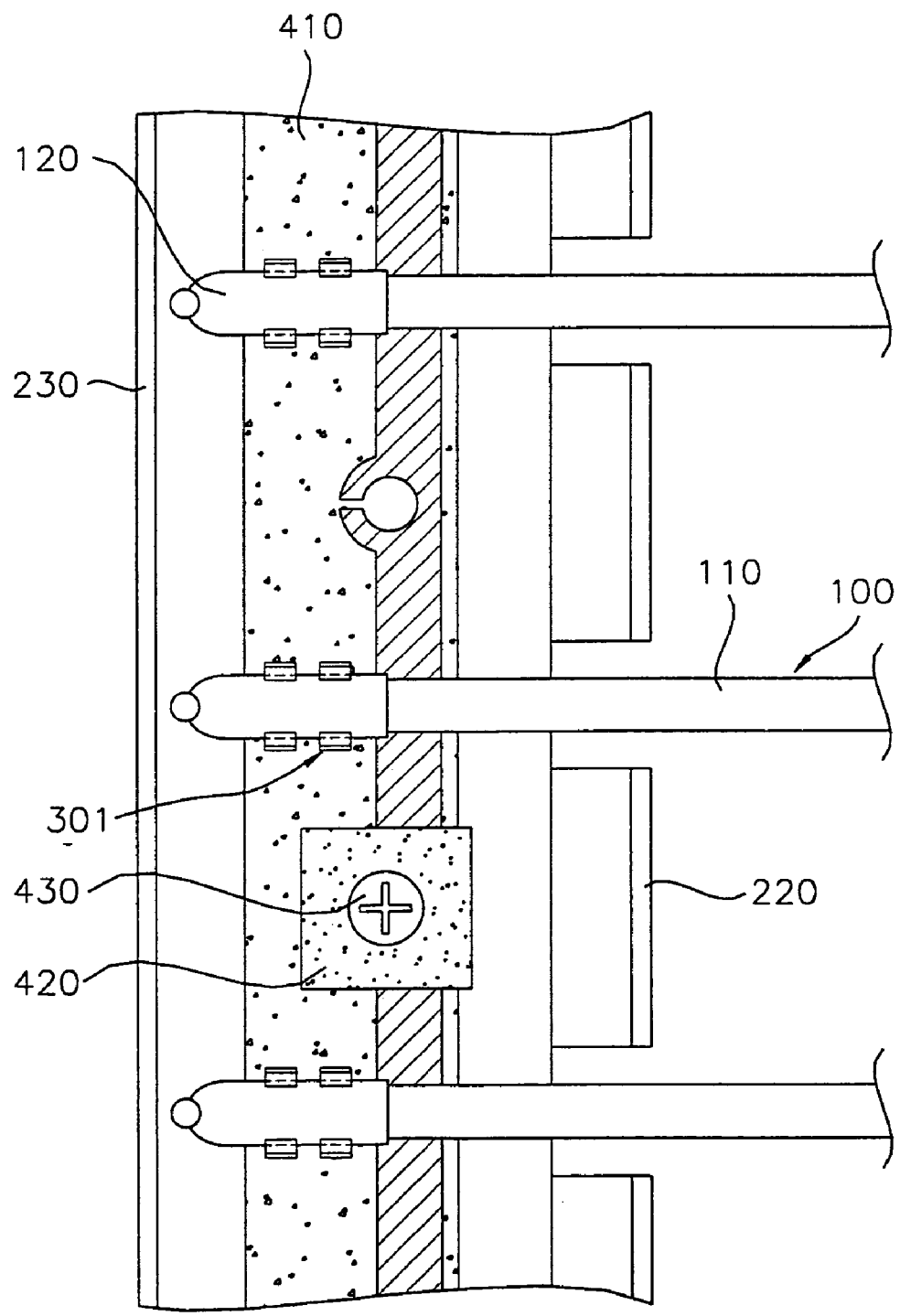
FIG. 10 is a perspective view showing an electrode socket part of a cold cathode fluorescent lamp coupled to a container.
Figure 11:
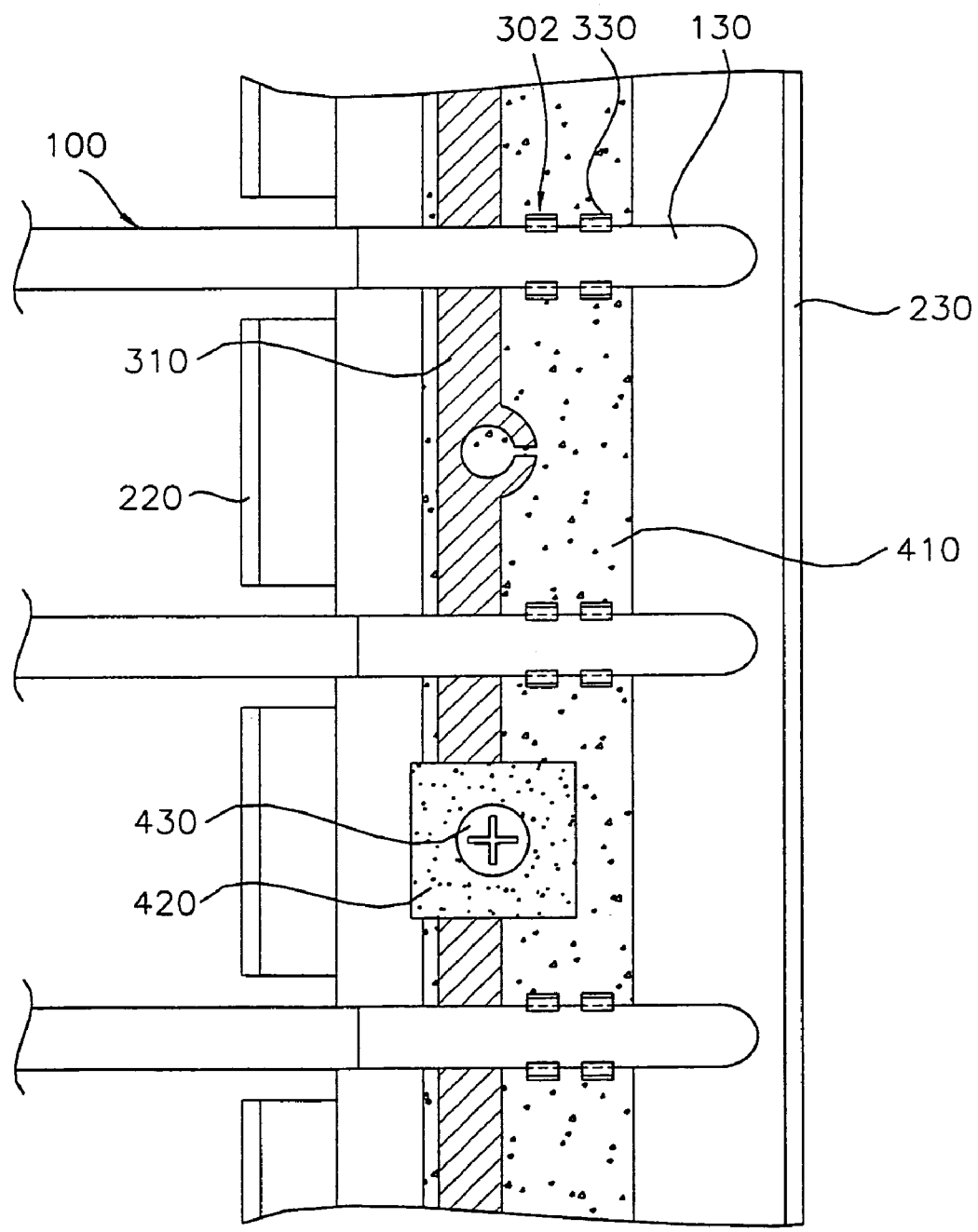
FIG. 11 is a perspective view showing a second electrode part of the cold cathode fluorescent lamp coupled to the container.

The container 200 may have a shock absorbing member to absorb an external impact not to be transferred to the cold cathode fluorescent lamp 100. As shown in FIGS. 8, 10 and 11, the container 200 includes a first shock absorbing member 410 and second shock absorbing member 420 at the container body 250.

The first shock absorbing member 410, for example, has a hexagonal plate shape. The first shock absorbing member 410 is made of a material which is able to absorb am impact applied thereto. For example, rubber can be used for this purpose.

Referring again to FIGS. 8, 10 and 11, the first shock absorbing member 410 is positioned between the clip type power-supplying modules 301 and 302 and the first side 210. The first shock absorbing member 410 is coupled to the container body 250 when the first side 210 is coupled to the clip type power-supplying modules 301 and 302.

The shock absorbing member 410 absorbs the external impact so as to prevent the cold cathode fluorescent lamp 100 from the external impact.

As shown in FIGS. 8, 10 and 11, the second shock absorbing member 420 can be placed on a portion of the upper surfaces of the clip type power-supplying modules 301 and 302 and screwed thereon by using the screw 430.

In one embodiment of the invention, the first shock absorbing member 410 having the hexagonal plate shape is positioned between the first side 210 and the clip type power-supplying modules 301 and 302. Then, the second shock absorbing member 420 is positioned on the upper surfaces of the clip type power-supplying modules 301 and 302. In this state, the first and second shock absorbing members 410 and 420 are screw-coupled by using the screw 430.

Figure 12:
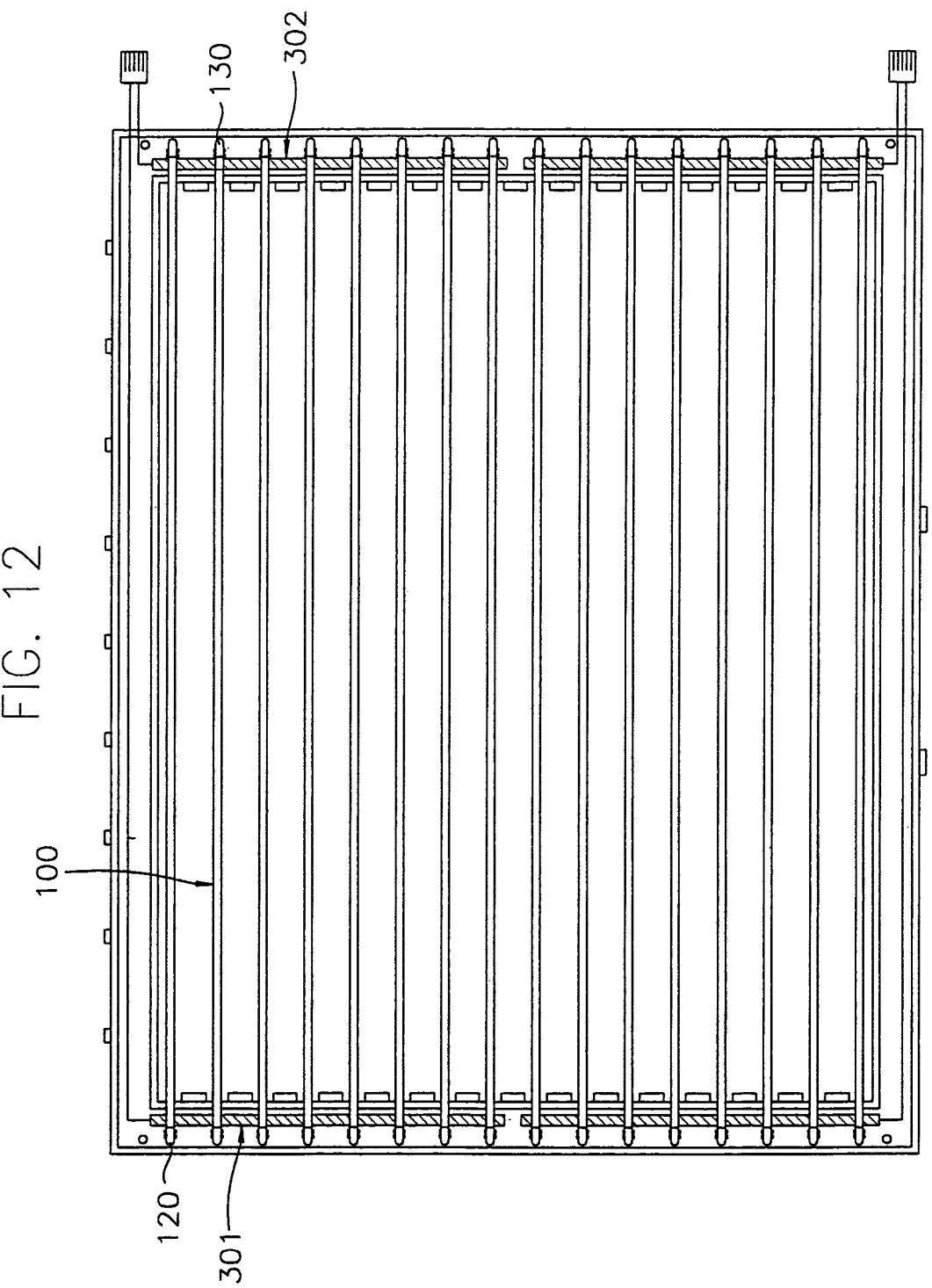
FIG. 12 is a bottom view showing a backlight assembly according to still another embodiment of the present invention.

The structure of the cold cathode fluorescent lamp 100 assembled with the container body 250 and the clip type power-supplying modules 301 and 302 is shown in FIG. 12.

Figure 13:
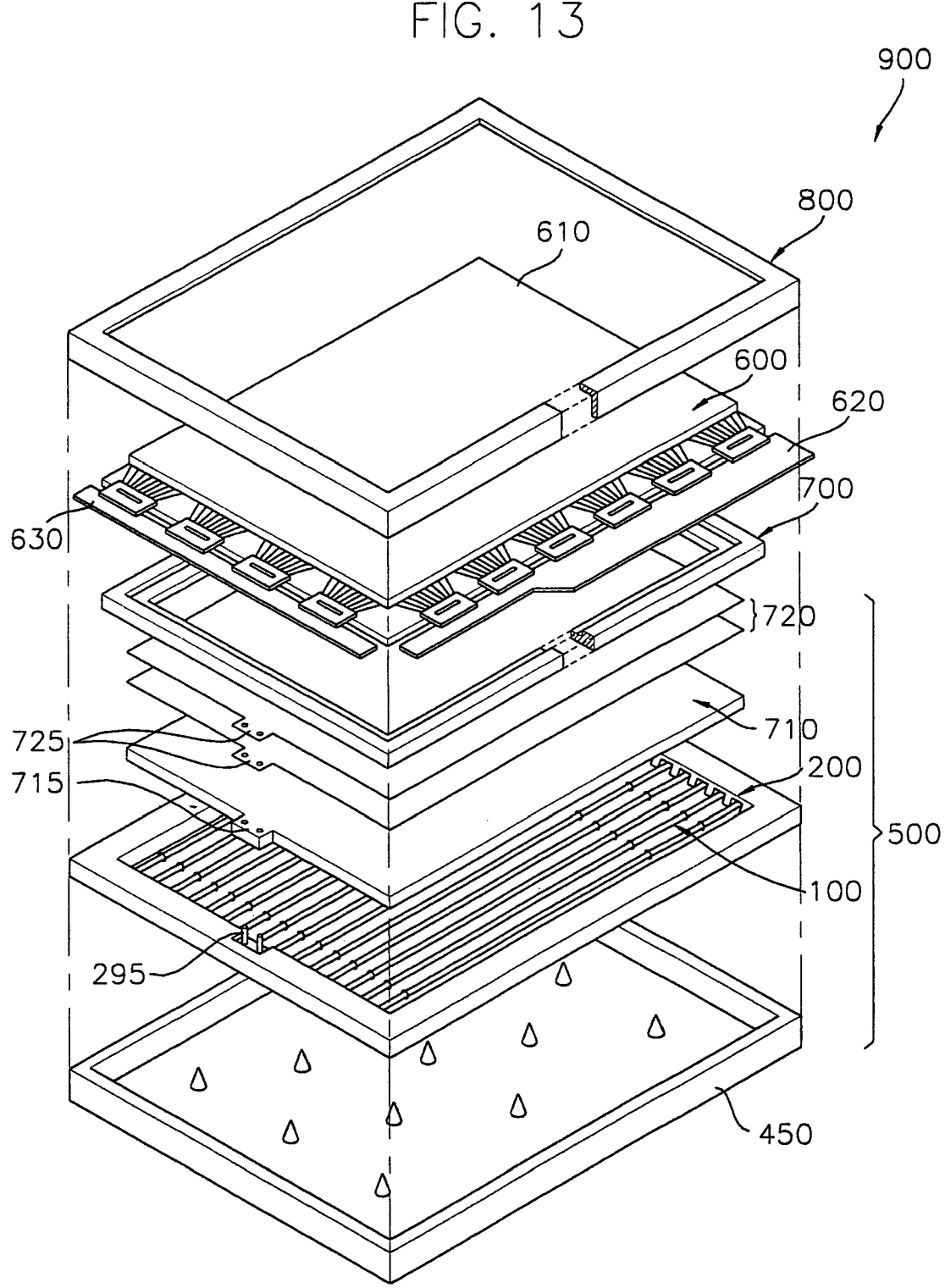
FIG. 13 is an exploded perspective view showing a structure of a liquid crystal display device according to still another embodiment of the present invention.

FIG. 13 shows a liquid crystal display device 900 for displaying information by using the container 200 and the cold cathode fluorescent lamp 100 coupled to the container 200.

The liquid crystal display device 900 mainly includes a backlight assembly 500 and a liquid crystal display panel assembly 600. The liquid crystal display device 900 selectively includes a top chassis 800 and an intermediate container 700 for connecting the backlight assembly 500 to the liquid crystal display panel assembly 600.

In detail, the liquid crystal display panel assembly 600 has a liquid crystal display panel 610 and driving devices 620 and 630.

Figure 14:
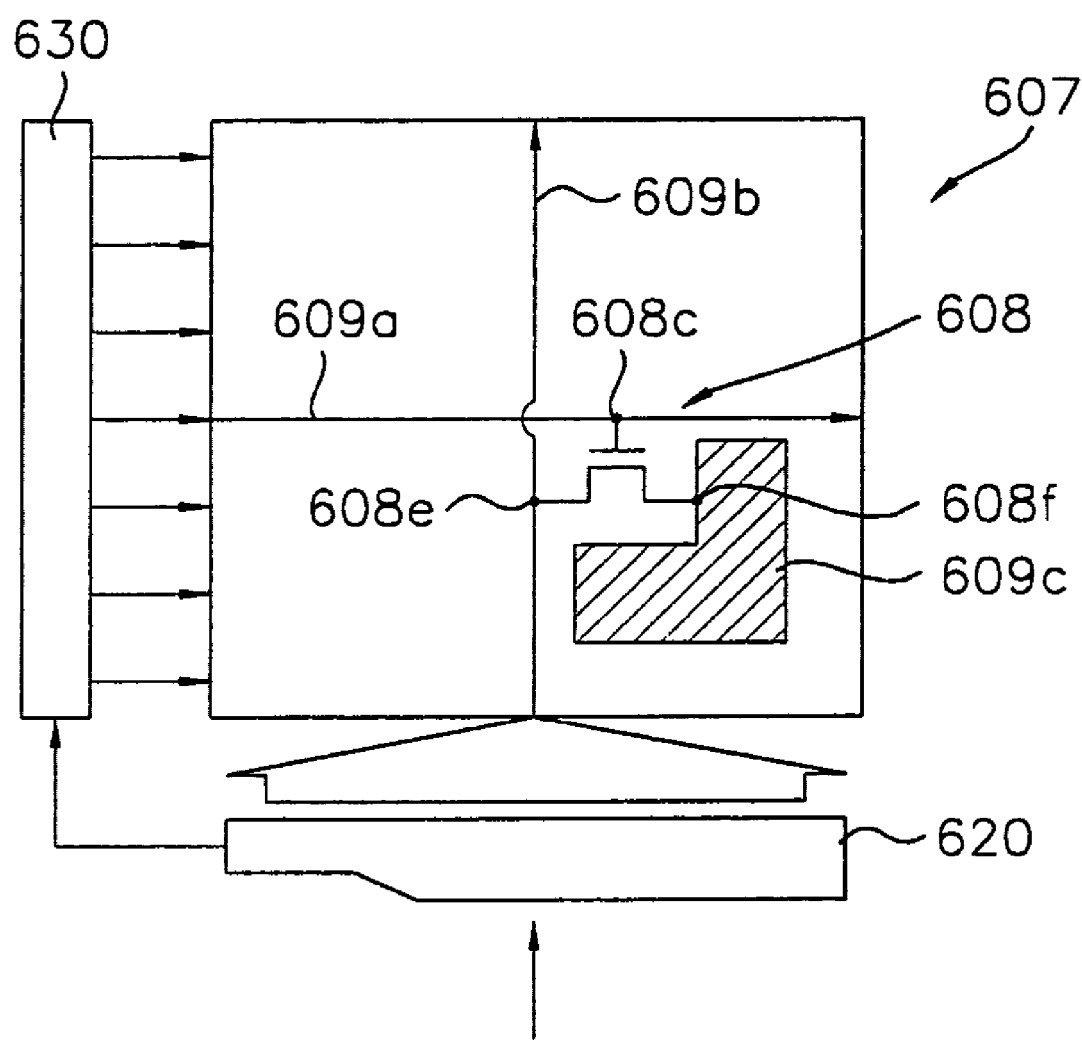
FIG. 14 is a schematic view showing a structure of a TFT substrate according to still another embodiment of the present invention.
Figure 15:
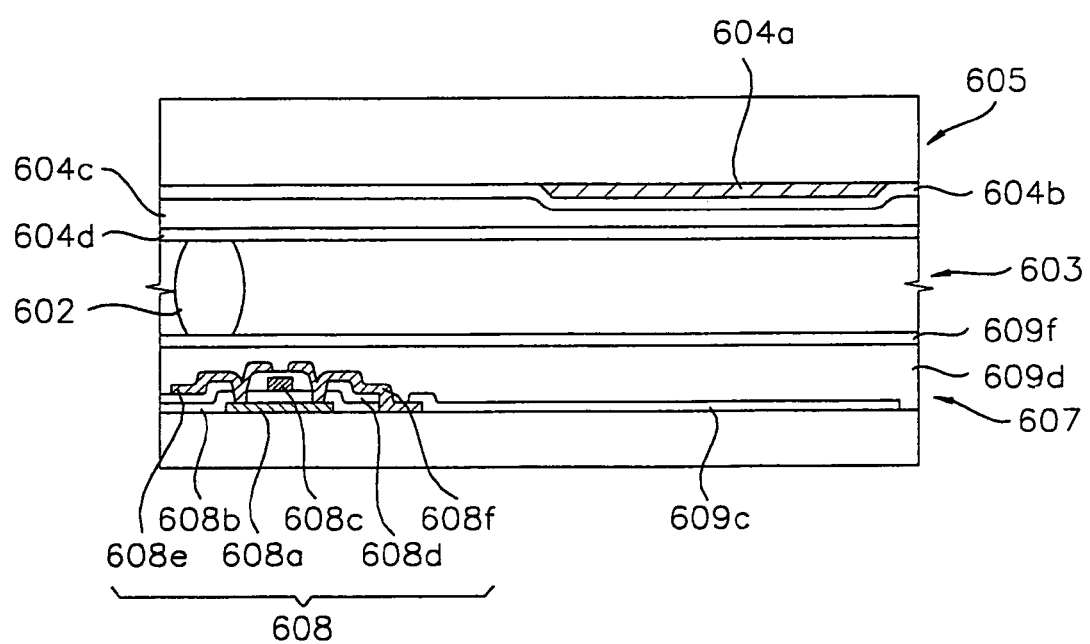
FIG. 15 is a sectional view showing an interior of a liquid crystal display panel assembly according to still another embodiment of the present invention.

Referring to FIGS. 14 and 15, the liquid crystal display panel 610 includes a color filter substrate 605, a TFT substrate 607 and a liquid crystal 603.

As shown in FIG. 14, the TFT substrate 607 comprises a transparent substrate, a thin film transistor 608, a gate line 609a, a data line 609b, and a pixel electrode 609c.

More specifically, the thin film transistor 608 is formed on the transparent substrate in a matrix pattern through a semiconductor thin film process. As shown in FIG. 15, the thin film transistor 608 includes a channel layer 608a, a first insulation layer 608b, a gate electrode 608c, a second insulation layer 608d, a source electrode 608e, and a drain electrode 608f.

Specifically, the channel layer 608a formed on the transparent substrate is made of amorphous silicon, and is disposed in a matrix pattern. The channel layer 608a is insulated by the first insulation layer 608b. In addition, the gate electrode 608c made of a metal is formed on a predetermined portion of the first insulation layer 608b corresponding to an upper portion of the channel layer 608a. The channel layer 608a stays in a nonconductive state if the power is not applied to the gate electrode 608c. On the contrary, the channel layer 608a is converted to a conductive state when the power is applied to the gate electrode 608c.

In addition, the gate electrode 608c is insulated by the second insulation layer 608d. Contact holes are formed through the second and first insulation layers 608d and 608b so as to expose the channel layer 608a to the exterior.

Then, the conductive source electrode 608e and the conductive drain electrode 608f are connected to the channel layer 608a via the contact holes, thereby forming the thin film transistor 608.

Consequently, the data line 609b is connected to the source electrode 608e, the gate line 609a is connected to the gate electrode 608c, and the transparent pixel electrode is connected to the drain electrode 608f.

Reference numeral 609d is an orientation layer, and reference numeral 609f is an orientation groove formed in the orientation layer 609d.

In addition, the color filter substrate 605 includes a transparent substrate, an RGB color pixel (or RGB color filter) 604a and a common electrode 604b.

The RGB color pixel 604a of the color filter substrate and pixel electrodes 609c of the TFT substrate 607 are opposite each other when they are assembled. The common electrode 604b, to which a predetermined voltage is applied, is formed over the entire upper surface of the RGB color pixel 604a.

Reference numeral 604c is an orientation layer and reference numeral 604d is an orientation groove formed in the orientation layer 609d.

In order to prevent the liquid crystal 603 from being leaked, sealant 602 is formed on edges of the TFT substrate 607, and spacers are distributed inner area of the sealant 602.

Then, the TFT substrate 607 and the color filter substrate 605 are fixed with respect to each other so as to form a predetermined cell gap therebetween. Next, the liquid crystal is injected into the cell gap formed between the TFT substrate 607 and the color filter substrate 605.

The liquid crystal 603, which is positioned between the pixel electrode 609c and the common electrode 604b of each thin film transistor 608, changes a light transmittance according to an intensity of a power applied to the pixel electrode 609c.

In order to control the transmittance of the light passing through the liquid crystal 603, a gate printed circuit board 630 is coupled to the gate line 609a through a tape carrier package, and a source printed circuit board 620 is coupled to the data line 609b through the tape carrier package.

The liquid crystal display panel assembly 600 having the above structure can control, in a minute area unit, the alignment of the liquid crystal 603 filled in the cell gap of the liquid crystal display panel 610. However, the liquid crystal display panel assembly 600 cannot display any information.

The liquid crystal 603 only adjusts the amount of the light transmitted therethrough. Therefore, light is required for displaying information in the liquid crystal display device 900.

In addition, the light with a nonuniform brightness is not appropriate for displaying information. If the light with a nonuniform brightness is used for displaying information, a picture displayed on a screen may be split or a part of the screen looks dark and the remaining of the screen looks bright.

Therefore, the light used in the liquid crystal display device 900 must have a uniform brightness. The backlight assembly 500 for generating the uniform brightness is provided in the liquid crystal display device 900.

The backlight assembly 500 includes a back cover 450, the container 200, the cold cathode fluorescent lamp 100, a power supply device for the lamp (not shown), and light uniformity improving modules 710 and 720.

As mentioned above with reference to FIG. 1 and 2, the cold cathode fluorescent lamp 100 includes the lamp tube 110, the first electrode 125, the electrode socket 120 and the second electrode 130.

The fluorescent layer 115 including a fluorescent material is formed at an inner wall of the lamp tube 110, and the gas 150 is filled in the lamp tube 110.

In addition, a portion of the first electrode 125 is positioned at the interior of the lamp tube 110, and the remaining portion of the first electrode 125 is positioned at the exterior of the lamp tube 110. The remaining portion of the first electrode 125 positioned at the exterior of the lamp tube 110 is coupled to the perforation hole formed in the electrode socket 120. Then, the first electrode 125 is soldered with the electrode socket 120.

The second electrode 130 is formed at the exterior of the lamp tube. The second electrode 130 is formed through the above-mentioned electroless plating technique such that a conductor is coated on a surface of the non-conductor lamp tube 110.

The cold cathode fluorescent lamp 100 having the above structure is accommodated in the container 200.

As shown in FIG. 8, the container 200 includes the container body 250 and the clip type power-supplying modules 301 and 302.

More specifically, the container body 250 has the rectangular frame shape so that the lamp tube 110 of the cold cathode fluorescent lamp 100 is maximally exposed, and so that the electrode socket 120 and the second electrode 130 are covered with the container body 250. Plural cold cathode fluorescent lamps 100 are parallelly arranged in the container body 250.

The cold cathode fluorescent lamps 100 are coupled to the container body 250 through the clip type power-supplying modules 301 and 302.

The clip type power-supplying modules 301 and 302 supply the power to all of the cold cathode fluorescent lamps 100. Clip body sections 320 and clip sections 330 are formed in the conductive base body 310 so as to grip the electrode socket 120 and the second electrode 130 of the cold cathode fluorescent lamp 100.

As shown in FIG. 8, in one embodiment of the present invention, the first shock absorbing member 410 is installed between the conductive base body 310 and the container body 250 so as to absorb the impact applied to the container body 250 before the impact is transferred to the cold cathode fluorescent lamp 100. In another embodiment of the present invention, the second shock absorbing member 420 can be installed on the upper surface of the conductive base body 310. In still another embodiment of the present invention, the first shock absorbing members 410 are installed between the conductive base body 310 and the container body 250, and at the same time the second shock absorbing members 420 are installed on the upper surface of the conductive base body 310.

In addition, a power supply line is connected to the conductive base body 310 coupled with the electrode socket 120 and the second electrode 130. A power supply device (not shown) for the lamp is connected to the power supply line. Accordingly, the light is generated in a state that the cold cathode fluorescent lamps 100 are fixed to the container body 250.

In order to enhance brightness uniformity throughout the cold cathode fluorescent lamps 100, the light uniformity improving modules 710 and 720 are further installed in the container 200.

The light uniformity improving modules 710 and 720 include a diffusing plate 710 and an optical sheet 720.

As shown in FIG. 13, coupling protrusions 715 and 725 are protruded from side portions of the diffusing plate 710 and the optical sheet 720, respectively. Each of coupling protrusions 715 and 725 has two coupling holes.

The diffusing plate 710 and the optical sheet 720 having the above structure are accommodated in the container 200, in such a manner that the electrode socket 120 and the second electrode 130 of the cold cathode fluorescent lamp 100 are covered with them. Coupling poles 295, which are inserted into the coupling holes 715 and 725 formed in the diffusing plate 710 and the optical sheet 720, are formed at the container 200.

The backlight assembly 500 manufactured through the above-mentioned process can generate a white light having a uniform brightness distribution. The white light generated from the backlight assembly 500 is supplied to the abovementioned liquid crystal display panel assembly 600. The backlight assembly 500 is assembled with the liquid crystal display panel assembly 600 optionally by interposing the intermediate container 700 therebetween.

Then, the top chassis 800 protecting the liquid crystal display panel 610 is assembled to the liquid crystal display panel assembly 600, thereby forming the liquid crystal display device.

According to one embodiment of the present invention, the lamp tube having an inner electrode at one portion thereof and an outer electrode at the other portion thereof is accommodated in the container having the clip type power-supplying modules.

However, according to another embodiment of the present invention, the cold cathode fluorescent lamp has a lamp tube having two electrodes accommodated therein. In this case, after coupling the electrode socket to both electrodes, the lamp tube is accommodated in the container having the clip type power-supplying modules. The same effect can be achieved in this embodiment when compared with the above-mentioned embodiment.

In addition, it is possible to provide a cold cathode fluorescent lamp having two electrodes positioned at the exterior of the lamp tube. In this case, the lamp tube with two electrodes positioned at the exterior of the lamp tube is accommodated in the container having the clip type power-supplying modules. The same effect can be achieved in this embodiment when compared with the above-mentioned embodiments.

As described above, according to the present invention, plural cold cathode fluorescent lamps are connected to one power supply device, so the brightness variation can be prevented, the power consumption can be remarkably reduced, and the assembling steps for the cold cathode fluorescent lamp can be simplified.

While the present invention has been described in detail with reference to the exemplary embodiments thereof, it should be understood to those skilled in the art that various changes, substitutions and alterations can be made hereto without departing from the scope of the invention as defined by the appended claims.

What is claimed is:

1. A liquid crystal display device comprising:
    a backlight assembly including:
        a lamp for generating a light and having a lamp tube and first and second conductive members;
        a container body for exposing the lamp tube of the lamp while covering the first and second conductive members;
        a power-supplying means for supplying a power to the first and second conductive members and fixing the first and second conductive members to the container body; and
        a light uniformity improving means for improving a uniformity of the light; and
    a liquid crystal display panel assembly coupled to the backlight assembly so as to display a picture by controlling a transmittance of the light passing through the light uniformity improving means,
    wherein the power-supplying means comprises a conductive base body coupled to the container body, a plurality of clip bodies protruded substantially perpendicularly from the conductive base body and a plurality of clip sections protruded from each clip body to be substantially perpendicular to both the clip bodies and the conductive base body, the clip sections being electrically connected to the conductive base body to grip one of the first and second conductive members.

2. The liquid crystal display device as claimed in claim 1, wherein the first conductive member comprises a first electrode including a first end disposed inside the lamp tube and a second end disposed outside the lamp tube, and a socket coupled to the second end of the first electrode, and a solder for electrically connecting the first electrode to the socket, and wherein the second conductive member includes a second electrode plated on an outer surface of the lamp tube.

3. A liquid crystal display device as claimed in claim 1, wherein the back light assembly further comprises a first shock absorbing member disposed between the container body and the power-supplying means, a second shock absorbing member disposed on the power-supplying means, and the container body, the power-supplying means, and the first and second shock absorbing members are coupled together by a coupling means.

4. The liquid crystal display device as claimed in claim 1, wherein the light uniformity improving means comprises a diffusing plate, which scatters the light so as to obtain a uniform brightness distribution, and an optical sheet for correcting a direction of the light passing through the diffusing plate.

5. The liquid crystal display device as claimed in claim 1, wherein the conductive base body and the clip bodies lie in substantially the same first plane and the clip sections lie in a plane substantially perpendicular to the first plane.

6. The liquid crystal display device as claimed in claim 1, wherein at least one of the first and second conductive members includes an external electrode partially covering an outer surface of the lamp tube.

7. The liquid crystal display device as claimed in claim 1, wherein the conductive base body has a coupling hole, which is coupled with a coupling terminal formed at an end of a power line for supplying a driving power to the lamp.

8. The liquid crystal display device as claimed in claim 7, wherein the power line is bypassed along an inner edge of the container.

9. A liquid crystal display device comprising:
    a backlight assembly including:
        a lamp generating a light and having a lamp tube and first and second conductive members attached to the lamp tube;
        a power-supply unit which supplies a power to the first and second conductive members and which fixes the first and second conductive members; and
        a container body which receives the lamp and the power supply unit; and
    a liquid crystal display panel assembly which displays a picture using the light from the lamp,
    wherein the power supply unit comprises:
    a conductive base body coupled to the container body;
    a plurality of clip body sections protruded from the conductive base body in a direction substantially parallel with a longitudinal direction of the lamp; and
    a plurality of clip sections protruded from an associated clip body section of the plurality of clip body sections and electrically connected to the conductive base body to grip one of the first and second conductive members.

10. The liquid crystal display device as claimed in claim 9, wherein the power supply unit has a clip-shaped coupling member to fix the first and second conductive members of the lamp in a clip-coupling manner.

11. The liquid crystal display device as claimed in claim 9, wherein the container body has a frame shape to cover at least a portion of the first and second conductive members of the lamp and to expose the lamp tube of the lamp.

12. The liquid crystal display device as claimed in claim 9, wherein at least one of the first and second conductive members includes an electrode socket configured to surround a portion of an outer surface of the lamp tube.

13. The liquid crystal display device as claimed in claim 9, further comprising a light uniformity improving member which improves uniformity of the light generated from the lamp and provides the uniformity-improved light to the liquid crystal display panel assembly.

14. The liquid crystal display device as claimed in claim 9, wherein the conductive base body and the clip body sections lie in substantially the same first plane and the clip sections lie in a plane substantially perpendicular to the first plane.

15. The liquid crystal display device as claimed in claim 9, wherein at least one of the first and second conductive members includes an external electrode partially covering an outer surface of the lamp tube.

* * * * *

UNITED STATES PATENT AND TRADEMARK OFFICE
CERTIFICATE OF CORRECTION

PATENT NO. : 7,607,791 B2 Page 1 of 1
APPLICATION NO. : 11/136634
DATED : October 27, 2009
INVENTOR(S) : Yoo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 493 days.

Signed and Sealed this

Twelfth Day of October, 2010

David J. Kappos
*Director of the United States Patent and Trademark Office*